US012511440B1

(12) United States Patent
Regmi et al.

(10) Patent No.: US 12,511,440 B1
(45) Date of Patent: Dec. 30, 2025

(54) SECURE DISCLOSURE OF DATA ATTESTATIONS

(71) Applicant: Wells Fargo Bank, N.A., San Francisco, CA (US)

(72) Inventors: Ashmita Regmi, San Francisco, CA (US); Arushi S. Joshi, Houston, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 415 days.

(21) Appl. No.: 18/050,325

(22) Filed: Oct. 27, 2022

(51) Int. Cl.
*G06F 21/64* (2013.01)
*G06F 21/60* (2013.01)
*H04L 9/32* (2006.01)

(52) U.S. Cl.
CPC ............ *G06F 21/64* (2013.01); *G06F 21/602* (2013.01); *H04L 9/3218* (2013.01)

(58) Field of Classification Search
CPC .................................................... G06F 21/554
See application file for complete search history.

(56) References Cited

U.S. PATENT DOCUMENTS

| | | | | |
|---|---|---|---|---|
| 11,379,213 | B1* | 7/2022 | Ansay | G06F 21/57 |
| 2023/0403154 | A1* | 12/2023 | Kaizer | H04L 9/3218 |
| 2024/0388579 | A1* | 11/2024 | Buchner | H04L 63/083 |

OTHER PUBLICATIONS

Benet et al., "IPFS powers the Distributed Web", GitHub, 6 pp., Retrieved from the Internet on Jan. 24, 2023 from URL: https://github.com/ipfs/ipfs.
Brook, "What's the Cost of a Data Breach in 2019?", DataInsider, Aug. 22, 2022, 4 pp., URL: https://digitalguardian.com/blog/whats-cost-data-breach-2019.
Buchner, "Sidetree Entity Protocol", GitHub, Apr. 7, 2018, 11 pp., URL: https://github.com/decentralized-identity/did-methods/blob/master/sidetrees/explainer.md.
Domansky, "US identity theft jumps as e-commerce grows", Payments Next, Mar. 17, 2021, 4 pp., URL: https://paymentsnext.com/us-identity-theft-jumps-as-e-commerce-grows/.
Fortune Business Insights, "Market Research Report", Jan. 2022, 11 pp., Retrieved from the Internet on Feb. 1, 2023 from URL: https://www.fortunebusinessinsights.com/industry-reports/identity-and-access-management-market-100373.

(Continued)

*Primary Examiner* — Simon P Kanaan
(74) *Attorney, Agent, or Firm* — Shumaker & Sieffert, P.A.

(57) ABSTRACT

This disclosure describes techniques for client-controlled and secure disclosure of attestations of identifying information of subjects. For example, a method includes obtaining, by a computing system, identifying information associated with a subject. The method also includes generating, by the computing system and based on the identifying information associated with the subject, a decentralized identifier (DID) associated with the subject and one or more attested claims of the identifying information associated with the subject. The method further includes receiving, by the computing system and from the subject, a request to send the identifying information to one or more relying parties, and in response, recording, by the computing system, the DID in a verifiable data registry, and sending, by the computing system, the one or more attested claims to the one or more relying parties.

20 Claims, 3 Drawing Sheets

(56) References Cited

OTHER PUBLICATIONS

MTS, "83% of Your Data Is Held by Companies You Probably Don't Know—Average Person's Data Held by 350 Brands", MartechSeries, Apr. 25, 2020, 3 pp., URL: https://martechseries.com/analytics/data-management-platforms/privacy-and-regulations/83-data-held-companies-probably-dont-know-average-persons-data-held-350-brands/.

Shepherd, "Overview: 30 Small Business Cyber Security Statistics", Fundera by Nerdwallet, Jan. 23, 2023, 9 pp., URL https://www.fundera.com/resources/small-business-cyber-security-statistics#:~:text=Cyber%20Security%20Statistics-,43%25%20of%20cyber%20attacks%20target%20small%20businesses.,than%20%242.2%20million%20a 620year. . . .

Sporny et al., "Decentralized Identifiers (DIDs) v1.0: Core architecture, data model, and representations", W3C Recommendation, Jul. 19, 2022, 110 pp., URL: https://w3c.github.io/did-core/.

Sporny et al., "Verifiable Credentials Data Model v1.1", W3C Recommendation, Mar. 3, 2022, 126 pp., URL: https://www.w3.org/TR/vc-data-model/.

Steele et al., "DID Specification Registries: The interoperability registry for Decentralized Identifiers", W3C Group Note, Jan. 24, 2023, 57 pp., URL: https://w3c.github.io/did-spec-registries/#did-methods.

Yale, "Mortgage borrowers report increasingly digitalexperiences", The Mortgage Reports, Aug. 30, 2018, 2 pp., URL: https://themortgagereports.com/42041/mortgage-borrowers-report-increasingly-digital-experiences.

\* cited by examiner

ID

SECURE DISCLOSURE OF DATA ATTESTATIONS

TECHNICAL FIELD

This disclosure relates to computing systems and, in various examples, to securing and sharing of personal data.

BACKGROUND

An "identity" (ID) represents one or more attributes of a subject, such as an individual, legal entity, or asset. An identity of a subject may be specified by physical ID documents (e.g., driver's licenses, passport, etc.). In some examples, a subject may have a "digital identity" that provides an aggregated view of physical traits and correlates the aggregated view of physical traits with digital identifiers and digital signatures.

A subject, such as an individual, may share identifying information of the subject to relying parties, such as organizations, that consume the identifying information of the subject to provide the subject with access to products or services. Relying parties typically collect and store the identifying information of the subject, and in some instances sell the identifying information without consent from the subject. However, relying parties are at risk of data breaches, which may compromise the privacy of the identifying information of subjects.

SUMMARY

This disclosure describes techniques for client-controlled and secure disclosure of attestations of identifying information of subjects. For example, a computing system (referred to herein as a "data attestation system") may issue decentralized identifiers (DIDs) and one or more attested claims (e.g., verifiable credentials) of identifying information of subjects, such as individuals, and share the attested claims, rather than the identifying information itself, to relying parties that use the attested claims to provide the individual with access to products or services. DIDs are globally unique identifiers designed to enable subjects (e.g., individuals, organizations, etc.) to generate their own identifiers using systems they trust. Entities may prove control over DIDs by proving ownership of cryptographic proofs, such as digital signatures, used to authenticate the DIDs. DIDs are typically recorded in a verifiable data registry, such as distributed ledger (e.g., blockchain), decentralized file system, database of any kind, peer-to-peer network, and other forms of trusted data storage. In some aspects, the data attestation system registers verifiable credentials of identifying information of individuals that can be verified with public keys controlled through the DID. A verifiable credential specifies information about a subject which can be cryptographically verified. The techniques described in this disclosure leverage the use of DIDs and verifiable credentials to disclose attestations of identifying information, rather than the identifying information itself, to relying parties, thereby protecting privacy.

In one example implementation, a data attestation system may obtain identifying information associated with a subject. The identifying information may include any information that identifies the subject, such as a name, gender, date of birth, address, phone number or other contact information, an identifier issued by a government organization (e.g., social security number (SSN), driver's license number, and/or other information that is associated with the individual (e.g., bank account, credit score, credit history, etc.). The data attestation system may create a DID associated with the subject and one or more attested claims of the identifying information associated with the subject.

The data attestation system may receive a request from the subject to send the identifying information associated with the subject to a relying party, e.g., to an organization that may use the identifying information of the subject to provide the subject with access to products or services. In response to receiving the request to send the identifying information of the subject, the data attestation system may hash and record the DIDs in a verifiable data registry, such as a distributed ledger (e.g., blockchain), decentralized file system, database of any kind, peer-to-peer network, and other forms of trusted data storage, which creates an immutable record within the verifiable data registry. The data attestation system may then send the attested claims, instead of the identifying information itself, to the relying party, which may verify the attested claims.

The techniques may provide one or more technical advantages in the form of technical improvements over information sharing mechanisms. By using DIDs and verifiable credentials, the techniques of this disclosure may enable sharing of attested claims to the identifying information of the subject rather than the identifying information itself, thereby eliminating the need to share identifying information to relying parties that may become compromised in the event of a data breach. Moreover, the techniques may also enable the subject to control the sharing of identifying information of the subject.

In one example, the techniques in this disclosure describe a method includes obtaining, by a computing system, identifying information associated with a subject. The method also includes generating, by the computing system and based on the identifying information associated with the subject, a decentralized identifier (DID) associated with the subject and one or more attested claims of the identifying information associated with the subject. The method further includes receiving, by the computing system and from the subject, a request to send the identifying information associated with the subject to one or more relying parties. Additionally, the method includes in response to receiving the request to send the identifying information associated with the subject to the one or more relying parties: recording, by the computing system, the DID in a verifiable data registry, and sending, by the computing system, the one or more attested claims to the one or more relying parties.

In another example, the techniques in this disclosure describe a computing system including a memory, and processing circuitry in communication with the memory, the processing circuitry being configured to obtain identifying information associated with a subject. The processing circuitry is further configured to generate, based on the identifying information associated with the subject, a decentralized identifier (DID) associated with the subject and one or more attested claims of the identifying information associated with the subject. The processing circuitry is also configured to receive, from the subject, a request to send the identifying information associated with the subject to one or more relying parties. Additionally, the processing circuitry is configured to, in response to receiving the request to send the identifying information associated with the subject to the one or more relying parties: record the DID in a verifiable data registry; and send the one or more attested claims to the one or more relying parties.

In another example, the techniques in this disclosure describe a non-transitory computer-readable medium encoded with instructions that, when executed by processing circuitry, cause the processing circuitry to obtain identifying information associated with a subject. The instructions also cause the processing circuitry to generate, based on the identifying information associated with the subject, a decentralized identifier (DID) associated with the subject and one or more attested claims of the identifying information associated with the subject. The instructions further cause the processing circuitry to receive, from the subject, a request to send the identifying information associated with the subject to one or more relying parties. Additionally, the instructions cause the processing circuitry to, in response to receiving the request to send the identifying information associated with the subject to the one or more relying parties: record the DID in a verifiable data registry; and send the one or more attested claims to the one or more relying parties.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Like reference characters denotes like elements throughout the text and figures.

DETAILED DESCRIPTION

Figure 1:
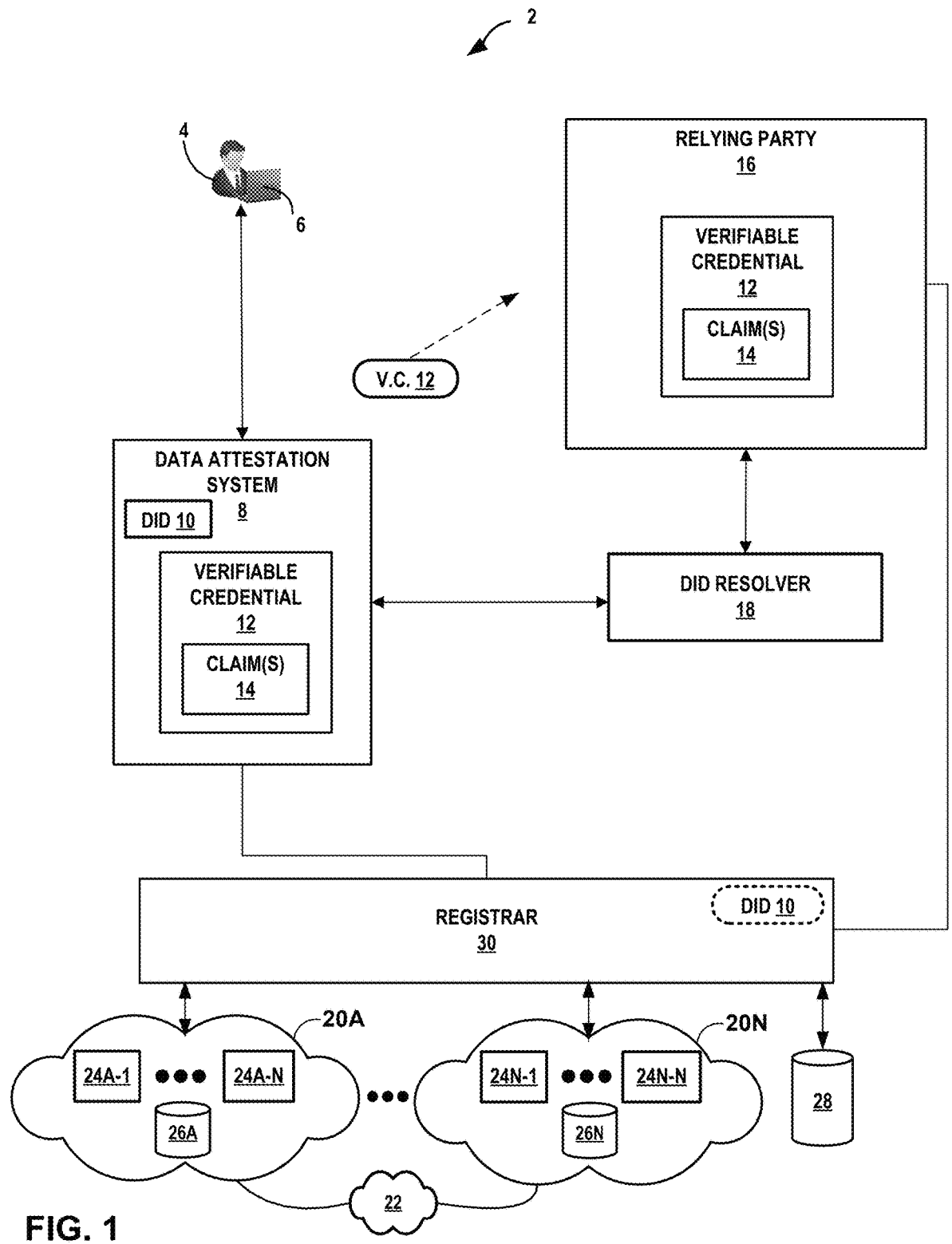
FIG. 1 is a conceptual diagram illustrating a system that provides client-controlled and secure disclosure of attestations of identifying information of clients, in accordance with one or more aspects of the present disclosure.

FIG. 1 is a conceptual diagram illustrating a system 2 that provides client-controlled and secure disclosure of attestations of identifying information of clients, in accordance with one or more aspects of the present disclosure. In the example of FIG. 1, system 2 includes multiple consensus systems, such as consensus system 20A through consensus system 20N (collectively, "consensus systems 20"). Consensus systems 20 are communicatively coupled via network 22 which may be part of a public network, such as the Internet. Each of consensus systems 20 includes a plurality of nodes. For instance, consensus system 20A includes nodes 24A-1 through 24A-N (collectively "nodes 24A"), which may represent any number of nodes, and consensus system 20N includes nodes 24N-1 through node 24N-N (collectively "nodes 24N"), which may represent any number of nodes. Each of nodes 24A-1 through 24A-N (shown within consensus system 20A) and each of nodes 24N-1 through 24N-N (shown within consensus system 20B) may be implemented as any suitable computing system, such as one or more server computers, workstations, mainframes, appliances, cloud computing systems, and/or other computing systems that may be capable of performing operations and/or functions described in accordance with one or more aspects of the present disclosure. One or more of nodes 24A and/or nodes 24N may, in some examples, represent a cloud computing system, server farm, and/or server cluster (or portion thereof) that provides services to client devices and other devices or systems. In other examples, nodes 24A and nodes 24N may represent or be implemented through one or more virtualized compute instances (e.g., virtual machines, containers) of a data center, cloud computing system, server farm, and/or server cluster. For instance, any or all of nodes 24A or nodes 24N may be implemented as Ethereum (or other blockchain) virtual machines.

Each of consensus systems 20 implements one or more distributed ledgers. In the example shown, consensus system 20A includes distributed ledger 26A that is implemented, for example, by a blockchain (e.g., the technology underlying various cryptocurrencies, such as Ethereum, Sovrin, and Bitcoin). Distributed ledger 26A may be implemented as a data store included in multiple (or all) nodes 24A within consensus system 20A. Consensus systems 20 (that is, the remainder of the consensus systems through consensus system 20N) may be implemented in a similar manner, so that each of consensus systems 20 includes one or more distributed ledgers 26 (e.g., consensus system 20N includes distributed ledger 26N). In general, each node within a respective consensus system 20 (or a significant fraction of the nodes) includes a copy (or at least a partial copy) of the distributed ledgers maintained by the respective consensus system 20.

Each of distributed ledgers 26 (e.g., included within each of consensus systems 20) may be shared transactional databases or data stores that include a plurality of blocks, each block (other than the root) referencing at least one block created at an earlier time, each block bundling one or more transactions registered within distributed legers 26, and each block cryptographically secured. Each of consensus systems 20 may receive transactions from transaction senders (e.g., computing devices external or internal to each of consensus systems 20) that invoke functionality of distributed ledgers 26 to modify a given distributed ledger 26 stored within a consensus system. Each of consensus systems 20 uses the distributed ledger 26 stored within the consensus system for verification of transactions. Each block of a distributed ledger typically contains a hash pointer as a link to a previous block, a timestamp, and the transaction data for the transactions. By design, distributed ledgers 26 are inherently resistant to modification of previously-stored transaction data. Functionally, each of distributed ledgers 26 serves as a ledger, distributed across many nodes of a consensus system, that can record transactions between parties efficiently and in a verifiable and permanent way.

Nodes 24 of each of consensus systems 20 implement one or more distributed ledgers 26. Each of consensus systems 20 may be a peer-to-peer network that manages one or more distributed ledgers 26 by collectively adhering to a consensus protocol and/or performing operations corresponding to various device identification-related or network-compliance-related rules set. Nodes 24 adhere to the protocol and/or rules for validating new blocks. Once recorded, the data in any given block of distributed ledgers 26 cannot be altered retroactively without the alteration of all subsequent blocks and a collusion of at least some (e.g., typically a majority) of nodes 24 of the particular consensus system. For instance, with reference to consensus system 20A, the data in a block within distributed ledger 26A cannot be altered retroactively without also altering all subsequent blocks without agreement of a majority of nodes 24A of consensus system 20A.

Alternatively, or additionally, system 2 includes a decentralized, content-addressable data store 28 ("decentralized data store 28"), such as IPFS. Decentralized data store 28 is a decentralized file system in which operators hold a portion of the overall data. Additional examples of a decentralized, content-addressable data store, such as IPFS, is described in https://github.com/ipfs/ipfs, the entire contents of which is incorporated by reference herein.

Client device 6 may be one of a variety of devices such as personal computers (e.g., desktop, laptop, netbook computers), handheld devices (e.g., tablet computers, smartphones), wearables (smartwatches, smart glasses, virtual reality headsets, augmented reality headsets), and so on. In some examples, client device 6 may be deployed for certain applications, such as applications that enable client 4 to gain access to products or services provided by organizations. Organizations may request identifying information of a subject, such as client 4, to enable client 4 to gain access to products or services provided by the organizations. An organization may represent an example of a relying party that relies on identifying information of a subject to provide the subject with access to products or services. Conventionally, a client may provide organizations with identifying information of the client. However, sharing identifying information of the client to the organizations may be a privacy risk. For example, organizations may store identifying information of clients that may become compromised in the event of a data breach and result in identity theft. Moreover, these organizations may share the identifying information of the clients, without consent by the clients, to other organizations that may also be at risk of a data breach, and thus furthering the risk of identity theft.

In accordance with the techniques described in this disclosure, system 2 includes a data attestation system 8 that provides client-controlled and secure disclosure of attestations of identifying information of clients. For example, data attestation system 8 may obtain identifying information of client 4, such as an individual, generate verifiable attestations of identifying information of client 4, and may share, in response to receiving consent by client 4, the verifiable attestations of identifying information of client 4 rather than the identifying information itself.

In the example of FIG. 1, data attestation system 8 may obtain identifying information associated with client 4, such as a name, date of birth or age, address, contact information (e.g., phone number or email), or the like. In some examples, client 4 may provide identifying information to data attestation system 8 via client device 6 (e.g., via an application executed on client device 6 that receives the identifying information as input from client 4). Alternatively, or additionally, an administrator of data attestation system 8 may obtain identifying information of client 4 (e.g., driver's license, government ID, etc.) from client 4 and the administrator of data attestation system 8 may provide the identifying information of client 4 to data attestation system 8. In some examples, data attestation system 8 may obtain identifying information of client 4 via other sources of data, such as trusted systems of record that store identifying information of client 4 (e.g., credit score, credit history, financial account information, financial account details, etc.). In some examples, data attestation system 8 may process information of client 4 to determine the client's risk in obtaining a product or service (e.g., risk indicators, product flags, etc.).

Data attestation system 8 may generate Decentralized Identifier (DID) associated with client 4 and one or more attested claims of the identifying information associated with client 4. DIDs are decentralized, unique identifiers that are cryptographically verifiable and do not require a centralized third-party trust anchor. As one example, a DID is generated for client 4 when client 4 applies for a product or service, and acts as a universal identifier for client 4.

In some examples, a DID may have a Universal Resource Name (URN) format as shown below:

did:example:123abc

The "did" field identifies the URN as belonging to a decentralized identifier scheme. The "example" field identifies the DID method used to define the DID and to identify a DID document type (as further described below). For example, DID methods may include Sovrin (e.g., "did:sov:"), Bitcoin (e.g., "did:btcr:"), InterPlanetary File System (IPFS) (e.g., "did:ipid:"), and other consensus systems and/or decentralized, content-addressable data stores. Additional examples of DID methods are further described in Draft Community Group Report 9 Aug. 2022, Credentials Community Group (W3C), available at https://w3c-ccg.github-b.io/did-method-registry/, the entire contents of which is incorporated by reference herein. The "123 abc" is the actual unique identifier associated with the subject of the DID. In the example of FIG. 1, data attestation system 8 may generate DID 10 associated with client 4.

Using DIDs, data attestation system 8 may register credentials (e.g., identifying information of individuals) that can be verified with public keys controlled through the DID, called "verifiable claims" or "verifiable credentials". A verifiable credential is used to extend the ability to assert a credential in a way that allows the credential to be cryptographically verified, preserves privacy by only allowing information related to the claim (e.g., attestation) to be exposed, and is machine-readable. In the example of FIG. 1, data attestation system 8 may generate verifiable credential 12 including one or more attestation claims 14 of the identifying information associated with client 4.

A verifiable credential (e.g., verifiable credential 12) may be a JSON-LD formatted document containing information about a DID subject (e.g., client 4) which can be cryptographically verified. An example of a verifiable credential is shown below:

```
{
    "@context": [
        "https://www.w3.org/2018/credentials/v1",
        "https://www.w3.org/2018/credentials/examples/v1"
    ],
    "id": "http://examples.com/credentials/3732",
    "issuer": "https://examples.com/issuers/14",
    "type": ["VerifiableCredential",
        "IdentifyingCredential"
    "issuer": "https://example.com/issuers/565049",
    "issuanceDate": "2022-09-10T00: 00:00Z",
    "credentialSubject": {
        "id": "did:example:123abc",
        "Location": "Lives in California",
        "Age": "Is between ages 25-30",
```

```
        "Credit Score": "Credit Score above 700",
        "Account Amount": "Has more than 25k available"
    }
}
    "proof": {
        "type": "Ed25519Signature2020",
        "created": "2022-09-10T00:00:05Z",
        "verificationMethod":
    "https://example.com/issuers/14#keys-1",
        "proofPurpose": "assertionMethod",
        "proofValue":
    "z490ZrBSGbo 4ASwCLCms2YGkGbgHtFyAv8J5849XF4qwhNqRvs92FZtH
    ZdHFMcAluwDWNKhxvikAvRfmUjKFJUUWT"
    }
}
```

The above example of a verifiable credential includes a "@context" property, the value of which is an array of links to one or more documents that establish the context for systems to exchange information. The "id" property contains an identifier for the verifiable credential document. The identifier may identify a subject, such as a person, product, or organization, such as DID 10 associated with client 4. The "id" property may be a Uniform Resource Identifier (URI). A "credentialSubject" may specify one or more credentials (e.g., attestation claims) of client 4. In this example, the "credentialSubject" may specify a "Location" property that specifies location of client 4, an "Age" property that specifies an age range of client 4, a "Credit Score" property that specifies whether a credit score of client 4 is above a particular score, an "Account Amount" property that specifies whether a banking account of client 4 is above a particular amount. The attestation claims specified in the verifiable credential described above is merely an example and may include any attestations of identifying information of a DID subject (e.g., client 4). In some examples, the one or more attestation claims may additionally, or alternatively, include risk indicators, product flags, and other information indicating any risks of the client obtaining the products or services. Additional examples of verifiable credentials are described in "Verifiable Credentials Data Model 1.1," 3 Mar. 2022, available at https://www.w3.org/TR/vc-data-model/, the entire contents of which is incorporated by reference herein.

While the verifiable credential described example above specifies the one or more attestation claims of client 4, the one or more attestation claims of client 4 may be alternatively specified in a separate record than the verifiable credential. For example, the one or more attestation claims of client 4 may be specified in a separate record associated with the DID (e.g., DID 10) and may be provided along with the DID to a relying party, e.g., relying party 16, that is requesting for identifying information of client 4.

In response to receiving a request from client 4 to send identifying information of client 4 to relying party 16, data attestation system 8 may register DID 10 in a verifiable data registry (e.g., distributed ledger 26) via registrar 30 and send the one or more attested claims to relying party 16. Registrar 30 may create a unique identifier on the distributed ledger and associate the unique identifier with one or more public keys. Registrar 30 may use, for example, a Sidetree protocol or other protocols to store DID information on distributed ledger 26. For example, registrar 30 may write a hash of the operations (e.g., create, read, update, delete (CRUD)) performed on a DID document that is associated with DID 10 to a distributed ledger 26, thereby creating an immutable record of those operations. Additional examples of the Sidetree protocol are described in D. Buchner, "Sidetree Entity Protocol," available at https://github.com/decentralized-identity/did-methods/blob/master/sidetrees/explainer.md, the entire contents of which is incorporated by reference herein.

DID 10 is associated with a DID document that contains information that describes the DID, such as a verification method (e.g., cryptographic public keys), that an entity may use to authenticate itself (e.g., prove control over the DID). For example, by way of a DID resolver 18, DID 10 may be used to obtain the associated DID document (e.g., by using the DID method specified in the DID). In some examples, a DID document is a JavaScript Object Notation for Linked Data (JSON-LD) document. In the example of FIG. 1, DID documents may be stored within distributed ledgers 26. For example, DID documents may be stored within distributed ledgers 26 based on a DID method. DID resolver 18 may resolve a DID to an associated DID document stored in distributed ledgers 26. In some examples, DID documents may be stored within decentralized data store 28 and DID resolver 18 may resolve a DID to an associated DID document stored in decentralized data store 28. DID resolver 18 may include plug-ins (e.g., DID drivers) for one or more of the DID methods as described above to lookup and resolve DIDs to associated DID documents stored in distributed ledgers 26 or decentralized data store 28. Additional examples of DID and DID document are further described in "Decentralized Identifiers (DIDs) v1.0," Credentials Community Group (W3C), 9 Jul. 2022, available at https://w3c-ccg.github.io/did-spec/, the entire contents of which is incorporated by reference herein.

Data attestation system 8 may send verifiable credential 12 (or in some examples, a separate record including the one or more attestation claims) to relying party 16 to attest to the legitimacy of credentials associated with client 4. As one example, data attestation system 8 may provide relying party 16 with a quick response (QR) code by which relying party 16 may obtain the one or more attestation claims. Relying party 16 may use DID 10 included in verifiable credential 12 to verify the attested claims (e.g., included in verifiable credential 12 and/or in a separate record associated with DID 10). For example, relying party 16 may resolve DID 10 to an associated DID document through DID resolver 18. Using the DID document, relying party 16 may determine the verification method (e.g., cryptographic public keys) used to prove data attestation system 8 has control over DID 10. In response to verifying the credentials in verifiable credential 12 and/or the separate record associated with DID 10, relying party 16 may process the attested claims, e.g., to provide client 4 with access to products or services.

The system of FIG. 1 is merely an example. The techniques and systems of this present disclosure may be performed with many more of such systems, components, devices, modules, and/or other items, and collective references to such systems, components, devices, modules, and/or other items may represent any number of such systems, components, devices, modules, and/or other items.

The techniques may provide one or more technical advantages in the form of technical improvements over information sharing mechanisms. By using DIDs and verifiable credentials, the techniques of this disclosure may enable a computing system to share attested claims to the identifying information of individuals rather than the identifying information itself, thereby eliminating the need to share identifying information to entities or organizations that may put the individual at risk of identity theft resulting from a data breach to the entities or organizations. Moreover, the techniques may also enable the individual to control the sharing of identifying information instead of the entity or organization.

Figure 2:
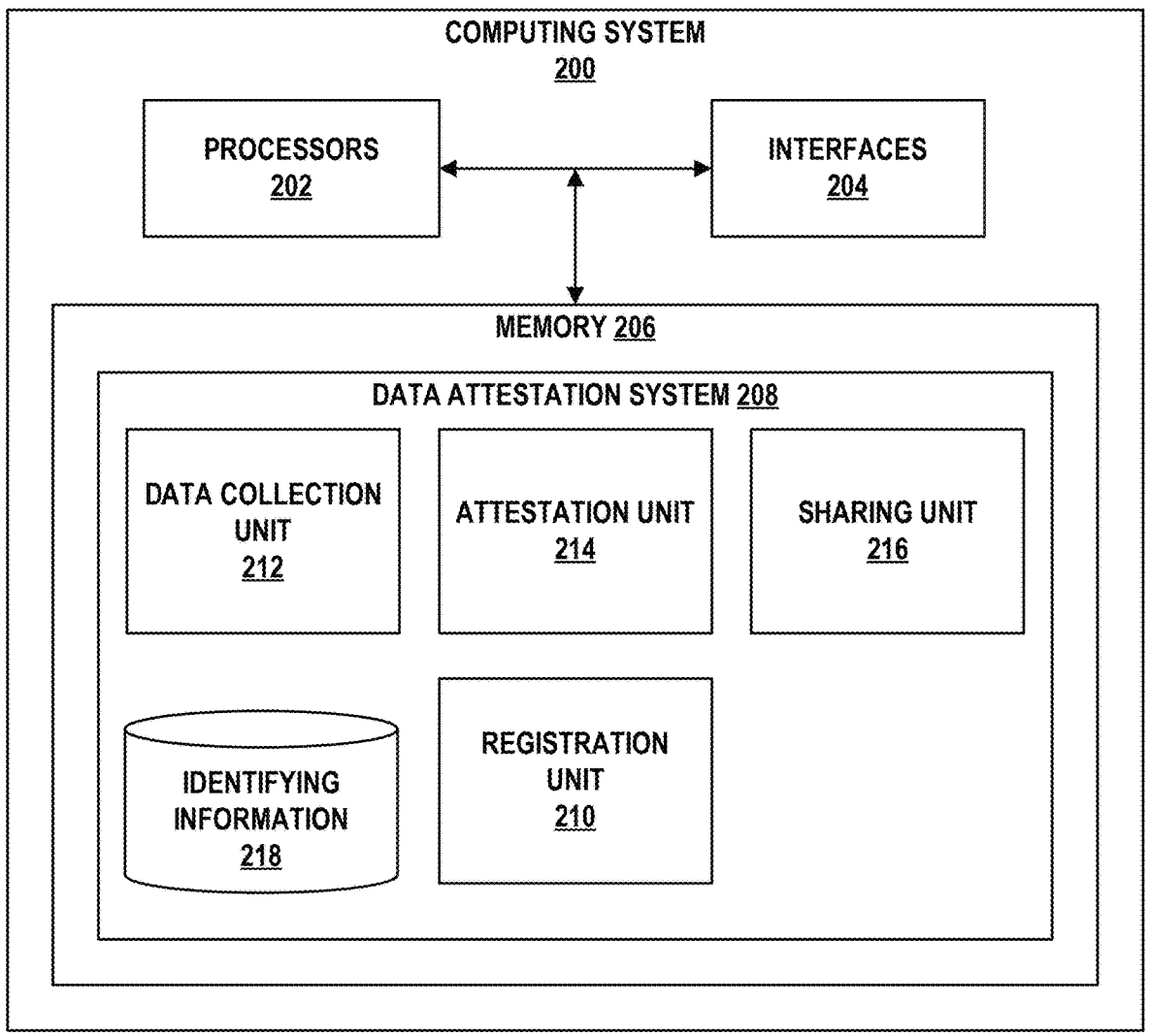
FIG. 2 is a block diagram illustrating an example computing system configured to execute a data attestation system, in accordance with one or more techniques described in this disclosure.

FIG. 2 is a block diagram illustrating an example computing system 200 configured to execute a data attestation system 208, in accordance with the techniques described in this disclosure. In some examples, data attestation system 208 may operate substantially similar to data attestation system 8 of FIG. 1.

In the example of FIG. 2, computing system 200 may include one or more computing devices. Computing system 200 includes processors 202, interfaces 204, and memory 206. Memory 206 stores data attestation system 208 that includes registration unit 210, data collection unit 212, attestation unit 214, and sharing unit 216. As illustrated in FIG. 2, the components, units or modules of computing system 200 are coupled (physically, communicatively, and/or operatively) using communication channels for inter-component communications. In some examples, the communication channels may include a system bus, a network connection, an inter-process communication data structure, or any other method for communicating data.

Processors 202, in one example, may comprise one or more processors that are configured to implement functionality and/or process instructions for execution within computing system 200. For example, processors 202 may be capable of processing instructions stored by memory 206. Processors 202 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 206 of computing system 200 may store an operating system (not shown) executable by processors 202 to control the operation of components of computing system 200. Memory 206 may also be configured to store information within computing system 200 during operation. Memory 206 may include a computer-readable storage medium or computer-readable storage device. In some examples, memory 206 includes one or more of a short-term memory or a long-term memory. Memory 206 may include, for example, random access memories (RAM), dynamic random-access memories (DRAM), static random-access memories (SRAM), magnetic discs, optical discs, flash memories, or forms of electrically programmable memories (EPROM) or electrically erasable and programmable memories (EEPROM). In some examples, memory 206 is used to store program instructions for execution by processors 202.

Memory 206 may be used by software or applications running on computing system 200 (e.g., data attestation system 208) to temporarily store information during program execution.

Computing system 200 may utilize interfaces 204 to communicate with other systems or devices via one or more connections or networks, e.g., client device 6, consensus systems 20, relying party 16 of FIG. 1. Interfaces 204 may be network interfaces (such as Ethernet interfaces, optical transceivers, radio frequency (RF) transceivers, Wi-Fi or Bluetooth radios, or the like), telephony interfaces, application programming interfaces (APIs), or any other type of interface that can send and receive information. In some examples, interfaces 204 may be a graphical user interface (GUI) to receive input from clients to access data attestation system 208, such as to provide identifying information to data attestation system 208 and/or to control the sharing of attestations of identifying information.

Data attestation system 208 may operate substantially similar to data attestation system 8 of FIG. 1. In the example of FIG. 2, data attestation system 208 may include a registration unit 210 to register authorized users that may have access to data attestation system 208. For example, a client (e.g., client 4 of FIG. 1) may provide registration information (e.g., biometrics, username and password, etc.) via interfaces 204 to authenticate the client's access to data attestation system 208.

Data collection unit 212 may obtain identifying information of client 4. In some examples, data collection unit 212 may obtain identifying information directly from client 4 via interfaces 204 that can receive information from client device 6. Alternatively, or additionally, an administrator of data attestation system 208 may obtain identifying information of client 4 from client 4 and the administrator of data attestation system 208 may provide the identifying information of client 4 to data attestation system 208 via interfaces 204 that is collected by data collection unit 212. In some examples, data attestation system 208 may obtain identifying information of client 4 via interfaces 204 that may receive information from other sources of data, such as systems of record that store identifying information of client 4 (e.g., credit score, credit history, financial account information, financial account details, etc.). The identifying information may be stored in identifying information database 218. Identifying information database 218 may represent a digital wallet or a device secure enclave.

In response to obtaining identifying information of client 4, attestation unit 214 may generate a DID (e.g., DID 10 of FIG. 1) and one or more attested claims about the identifying information of client 4. In some examples, the one or more attested claims are included in a verifiable credential (e.g., verifiable credential 12 of FIG. 1) or a separate record associated with the DID. In some examples, attestation unit 214 may generate DIDs in accordance with the specification described in "Decentralized Identifiers (DIDs) v1.0," Credentials Community Group (W3C). In some examples, attestation unit 214 may verify the identifying information of client 4 prior to generating the DID and one or more attested claims. For example, attestation unit 214 may verify whether the identifying information is provided by a trusted source (e.g., government issued identification) or obtained from a trusted data source (e.g., FICO, banking institutions, etc.).

Sharing unit 216 may receive a request from client 4 to send identifying information of client 4 to one or more relying parties (e.g., relying party 16 of FIG. 1). In response, sharing unit 216 may register the DID associated with client 4 (e.g., DID 10 of FIG. 1) in a verifiable data registry (e.g., distributed ledger 26 of FIG. 1) via a registrar (e.g., registrar 30 of FIG. 1) and share the one or more attested claims of the identifying information associated with client 4 to relying party 16. In some examples, sharing unit 216 may receive a request from client 4 to selectively send attestations of identifying information to particular relying parties (e.g., sending information to a banking institution and not to a utilities company) and/or selectively sending particular identifying information to the relying parties (e.g., sending SSN, but not specific amount in banking account). For example, client 4 may request to send identifying information to obtain a mortgage loan from relying party 16. To obtain a mortgage loan, relying party 16 typically uses identifying information such as financial information (e.g., bank account amount, credit score, credit history, etc.) and personal information (e.g., social security number, date of birth, etc.) as a basis for providing the client with a mortgage loan. In this example, sharing unit 216 may receive a request from client 4 to send a hybrid of the identifying information itself and attestation claims, such as sending the date of birth and/or social security number, and the attested claims of the financial information, such as whether client 4 has a bank account with an amount greater than a particular threshold amount (e.g., bank account amount greater than $25 k), whether client 4 has a credit score greater than the credit score threshold (e.g., credit score greater than 700), whether client 4 was late on any payments (e.g., no late payments in 2 years), or any other information necessary to obtain a mortgage loan.

As another example, client 4 may request to share a proof of age to obtain goods that have a legal age requirement. To obtain these goods, relying party 16 typically uses identifying information such as date of birth. In this example, sharing unit 216 may share an attested claim about the age of client 4, such as whether client 4 is above the age requirement (e.g., above the age of 21).

As one example, sharing unit 216 may provide relying party 16 with a QR code by which relying party 16 may obtain the one or more attested claims. Relying party 16 may use DID 10 included in verifiable credential 12 to verify the attested claims (e.g., included in verifiable credential 12 or a separate record associated with the DID). For example, relying party 16 may resolve DID 10 to an associated DID document through DID resolver 18. Using the DID document, relying party 16 may determine the verification method (e.g., cryptographic public keys) used to prove data attestation system 208 has control of DID 10. In response to verifying the one or more attested claims included in verifiable credential 12 or a separate record associated with DID 10, relying party 16 may process the attested claims, e.g., to provide client 4 with access to products or services.

In some examples, functions performed by data attestation system 208 could be performed by software or by a hardware device executing software. In other examples, functions performed by data attestation module 208 may be implemented primarily or partially through hardware, such as by processing circuitry of computing device 200.

Figure 3:
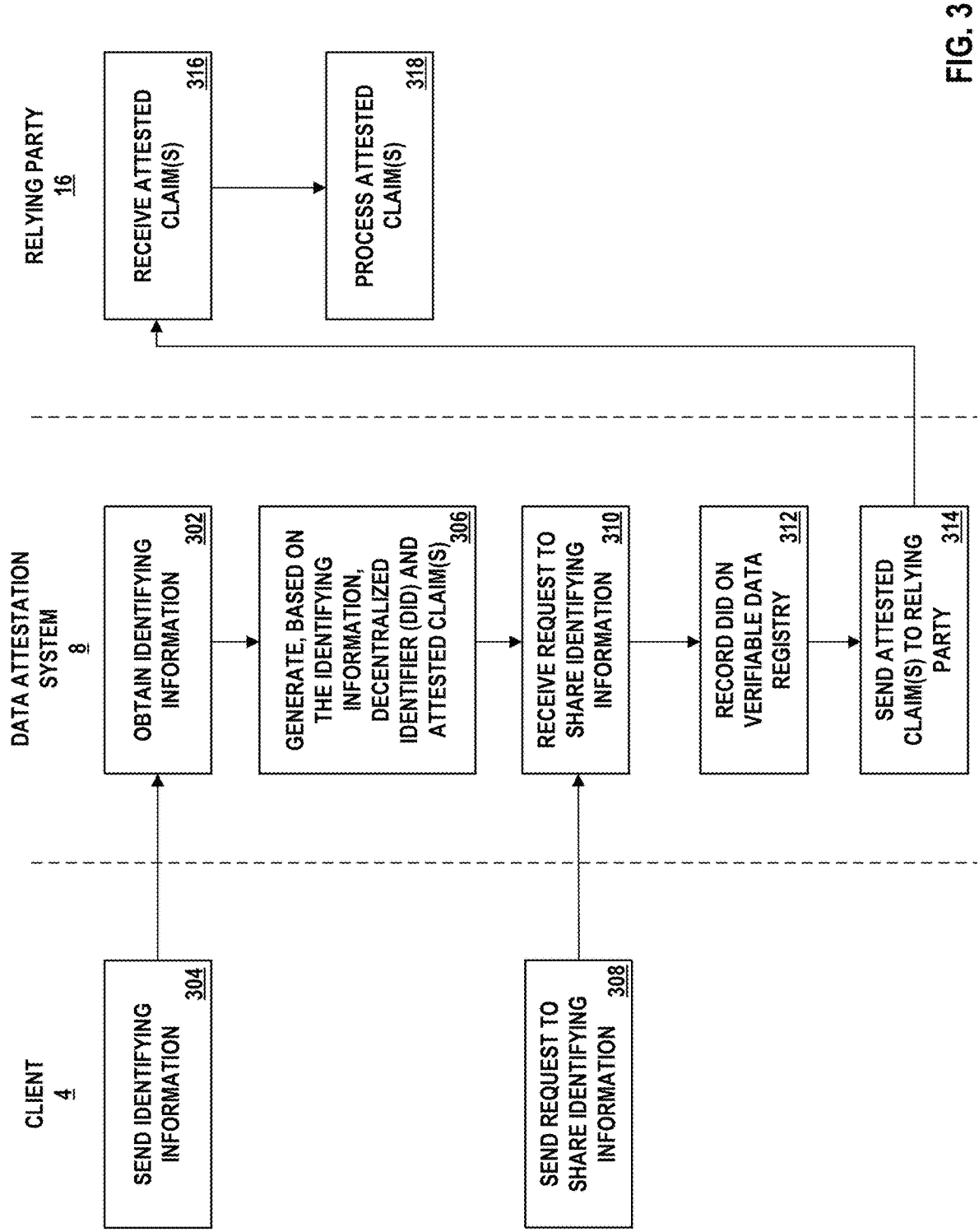
FIG. 3 is a flowchart illustrating an example operation of a data attestation system, in accordance with one or more techniques described in this disclosure.

FIG. 3 is a flowchart illustrating an example operation of a data attestation system, in accordance with the techniques of this disclosure. For purposes of explanation, the example operation of FIG. 3 is described with respect to data attestation system 8 of FIG. 1 and data attestation system 208 of FIG. 2.

Data attestation system 8 obtains identifying information of a subject (302). For example, client 4 may send identifying information to data attestation system 8 (304) via client device 6 (e.g., via an application executed on client device 6 that receives the identifying information as input from client 4). Alternatively, or additionally, an administrator of data attestation system 8 may obtain identifying information of client 4 (e.g., driver's license, government ID, etc.) from client 4 and the administrator of data attestation system 8 may provide the identifying information of client 4 to data attestation system 8. In some examples, data attestation system 8 may obtain identifying information of client 4 via other sources of data, such as trusted systems of record that store identifying information of client 4 (e.g., credit score, credit history, financial account information, financial account details, etc.). In some examples, data attestation system 8 may authenticate client 4's access to data attestation system 8 prior to obtaining identifying information associated with client 4. For example, data attestation system 8 may receive registration information (e.g., biometrics, logic credentials, etc.) from client 4 and authenticate, based on the registration information, client 4 to have access to data attestation system 8. Once authenticated, data attestation system 8 may then obtain identifying information of client 4.

Data attestation system 8 generates, based on the identifying information, a decentralized identifier (DID) associated with client 4 and one or more attested claims of the identifying information associated with client 4 (306). For example, data attestation system 8 may generate a DID associated with client 4 and one or more attested claims of identifying information of client 4. In some examples, the one or more attested claims are included in a verifiable credential (e.g., verifiable credential 12 of FIG. 1) or a separate record associated with the DID. As described above, the entity may prove control over the DID by proving ownership of cryptographic proofs, such as digital signatures, used to authenticate the DIDs. Using DIDs, data attestation system 8 may register verifiable credentials that are used to extend the ability to assert a credential in a way that allows the credential to be cryptographically verified, preserves privacy by only allowing information related to the claim to be exposed, and is machine-readable. In some examples, data attestation system 8 may verify the identifying information of client 4 prior to generating the DID and one or more attested claims. For example, data attestation system 8 may verify whether the identifying information is provided by a trusted source (e.g., government issued identification) or obtained from a trusted data source (e.g., FICO, banking institutions, etc.).

Client 4 may request to send the identifying information to one or more relying parties, e.g., relying party 16 (308). In some examples, the request to send the identifying information associated with client 4 may include an indication of a particular relying party for which to send the identifying information and/or an indication of particular identifying information that is to be sent to the one or more relying parties (e.g., send SSN and not send date of birth).

In response to receiving the request from client 4 to send identifying information (310), data attestation system 8 records the decentralized identifier associated with client 4 on a verifiable data registry (312). For example, data attestation system 8 may register the DID in a distributed ledger 26 via registrar 30, which creates a unique identifier on the distributed ledger and associates the unique identifier with one or more public keys.

Data attestation system 8 then sends the one or more attested claims included in a verifiable credential or separate record associated with the DID to the relying party (314), which in turn receives the one or more attested claims (316)

and processes the one or more attested claims (318). As one example, data attestation system 8 may provide relying party 16 with a quick response (QR) code by which relying party 16 may use to obtain the one or more attested claims. Relying party 16 may use the DID included in verifiable credential to verify the attested claims. For example, relying party 16 may resolve the DID to an associated DID document through DID resolver 18. Using the DID document, relying party 16 may determine the verification method (e.g., cryptographic public keys) used to prove data attestation system 8 has control of the DID. In response to verifying the one or more attested claims, relying party 16 may process the attested claims, e.g., to provide client 4 with access to products or services.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

What is claimed is:

1. A method comprising:
   obtaining, by a computing system, financial information and personal information associated with a subject;
   generating, by the computing system and based on the financial information and the personal information associated with the subject, a decentralized identifier (DID) associated with the subject and one or more attested claims of the financial information and one or more attested claims of the personal information associated with the subject;
   receiving, by the computing system and from the subject, a request indicating at least a selected portion of the financial information and the personal information associated with the subject to send to one or more relying parties; and
   in response to receiving the request:
      recording, by the computing system, the DID in a verifiable data registry; and
      sending, by the computing system and based on the selected portion of the financial information and the personal information associated with the subject indicated in the request, at least a portion of the one or more attested claims of the financial information and the one or more attested claims of the personal information associated with the subject to the one or more relying parties.

2. The method of claim 1, wherein the one or more attested claims of the financial information and the one or more attested claims of the personal information are included in a verifiable credential that includes the DID associated with the subject.

3. The method of claim 2, wherein the verifiable credential includes a cryptographic proof of ownership of the DID.

4. The method of claim 1, further comprising:
   prior to obtaining the financial information and the personal information associated with the subject, receiving, by the computing system, registration information associated with the subject; and
   authenticating, by the computing system and based on the registration information associated with the subject, the subject to have access to the computing system.

5. The method of claim 1, wherein obtaining the personal information associated with the subject comprises:
   receiving, from the subject, the personal information associated with the subject.

6. The method of claim 1, wherein obtaining the personal information associated with the subject comprises:
   receiving, from a system of record, the personal information associated with the subject.

7. The method of claim 1, further comprising:
   prior to generating the DID associated with the subject and one or more attested claims of the financial information and the one or more attested claims of the personal information associated with the subject, verifying, by the computing system, the personal information associated with the subject.

8. The method of claim 1, wherein the request comprises an indication of a particular relying party of the one or more relying parties to which to send at least the selected portion of the financial information and the personal information associated with the subject.

9. The method of claim 1, wherein the request comprises an indication of a particular portion of the financial information and a particular portion of the personal information associated with the subject that is to be sent to the one or more relying parties.

10. The method of claim 1, wherein sending at least the portion of the one or more attested claims of the financial information and the one or more attested claims of the personal information associated with the subject to the one or more relying parties comprises sending a quick response (QR) code associated with the portion of the one or more attested claims of the financial information and the one or more attested claims of the personal information.

11. A computing system comprising:
a memory; and
processing circuitry in communication with the memory, the processing circuitry being configured to:
obtain financial information and personal information associated with a subject;
generate, based on the financial information and the personal information associated with the subject, a decentralized identifier (DID) associated with the subject and one or more attested claims of the financial information and one or more attested claims of the personal information associated with the subject;
receive, from the subject, a request indicating at least a selected portion of the financial information and the personal information associated with the subject to send to one or more relying parties; and
in response to receiving the request:
record the DID in a verifiable data registry; and
send, based on the selected portion of the financial information and the personal information associated with the subject indicated in the request, at least a portion of the one or more attested claims of the financial information and the one or more attested claims of the personal information to the one or more relying parties.

12. The computing system of claim 11, wherein the one or more attested claims of the financial information and the one or more attested claims of the personal information are included in a verifiable credential that includes the DID associated with the subject.

13. The computing system of claim 11, wherein the processing circuitry is further configured to:
prior to obtaining the financial information and the personal information associated with the subject, receive registration information associated with the subject; and
authenticate, based on the registration information associated with the subject, the subject to have access to the computing system.

14. The computing system of claim 11, wherein to obtain the financial information and the personal information associated with the subject, the processing circuitry is further configured to:
receive, from the subject, the personal information associated with the subject.

15. The computing system of claim 11, wherein to obtain the financial information and the personal information associated with the subject, the processing circuitry is further configured to:

receive, from a system of record, the personal information associated with the subject.

16. The computing system of claim 11, wherein the processing circuitry is further configured to:
prior to generating the DID associated with the subject and one or more attested claims of the financial information and the one or more attested claims of the personal information associated with the subject, verify the personal information associated with the subject.

17. The computing system of claim 11, wherein the request comprises an indication of a particular relying party of the one or more relying parties to which to send at least the selected portion of the financial information and the personal information associated with the subject.

18. The computing system of claim 11, wherein the request comprises an indication of a particular portion of the financial information and a particular portion of the personal information associated with the subject that is to be sent to the one or more relying parties.

19. The computing system of claim 11, wherein to send the portion of the one or more attested claims of the financial information and the one or more attested claims of the personal information to the one or more relying parties, the processing circuitry is further configured to send a quick response (QR) code associated with the portion of the one or more attested claims of the financial information and the one or more attested claims of the personal information associated with the subject.

20. Non-transitory computer-readable media encoded with instructions that, when executed by processing circuitry, cause the processing circuitry to:
obtain financial information and personal information associated with a subject;
generate, based on the financial information and the personal information associated with the subject, a decentralized identifier (DID) associated with the subject and one or more attested claims of the financial information and one or more attested claims of the personal information associated with the subject;
receive, from the subject, a request indicating at least a selected portion of the financial information and the personal information associated with the subject to send to one or more relying parties; and
in response to receiving the request to:
record the DID in a verifiable data registry; and
send, based on the selected portion of the financial information and the personal information indicated in the request, at least a portion of the one or more attested claims of the financial information and the one or more attested claims of the personal information to the one or more relying parties.

* * * * *